United States Patent
Nagasawa et al.

(10) Patent No.: US 8,304,928 B2
(45) Date of Patent: Nov. 6, 2012

(54) ELECTRONIC DOOR SYSTEM WITH A LIN-SUBBUS

(75) Inventors: Kazumi Nagasawa, Toyota (JP); Toshiaki Ozaki, Toyota (JP); Norihito Shimizu, Toyota (JP)

(73) Assignee: Yazaki Corporation, Tokyo (JP)

( * ) Notice: Subject to any disclaimer, the term of this patent is extended or adjusted under 35 U.S.C. 154(b) by 1958 days.

(21) Appl. No.: 10/548,647

(22) PCT Filed: Apr. 1, 2004

(86) PCT No.: PCT/JP2004/004787
§ 371 (c)(1),
(2), (4) Date: Sep. 13, 2005

(87) PCT Pub. No.: WO2004/089696
PCT Pub. Date: Oct. 21, 2004

(65) Prior Publication Data
US 2006/0197378 A1    Sep. 7, 2006

(30) Foreign Application Priority Data
Apr. 3, 2003 (JP) .............................. P2003-100457

(51) Int. Cl.
B60L 1/00 (2006.01)
B60L 3/00 (2006.01)
(52) U.S. Cl. .................................................. 307/9.1
(58) Field of Classification Search ............... 307/9.1
See application file for complete search history.

(56) References Cited

U.S. PATENT DOCUMENTS

| | | |
|---|---|---|
| 4,156,151 A | 5/1979 | Borroni |
| 5,508,689 A | 4/1996 | Rado et al. |
| 5,670,845 A | 9/1997 | Grant et al. |
| 5,990,573 A | 11/1999 | Granitz et al. |
| 6,420,797 B1 | 7/2002 | Steele et al. |
| 6,485,155 B1 | 11/2002 | Duroux et al. |
| 7,161,985 B2 * | 1/2007 | Dostert et al. ............... 375/257 |
| 2002/0065594 A1 | 5/2002 | Squires et al. |
| 2003/0001434 A1 * | 1/2003 | Saito et al. ................ 307/10.1 |

FOREIGN PATENT DOCUMENTS

DE    197 39 410 C    12/1998
JP    2001-287605 A   10/2001

OTHER PUBLICATIONS

J. Will Specks, et al., "Lin Protocol, Development Tools, and Software Interfaces for Local Interconnect Networks in Vehicles", 9th International Conference on Electronic Systems for Vehicles, Baden-Baden, Oct. 5/6, 2000, www.lin-subbus.org, pp. 1-24.
Hans-Christian von der Wense, "Introduction to Lin", www.lin-subbus.org, Mar. 2000, 26 Pages.

* cited by examiner

Primary Examiner — Rexford Barnie
Assistant Examiner — Dru Parries
(74) Attorney, Agent, or Firm — Sughrue Mion, PLLC

(57) ABSTRACT

Load type electrical parts incorporated in auxiliary machine modules 164a to 184a are driven by electrical connectors 160a to 180a having communicating units, control units and load driving units mounted on electronic boards. An electronic door control unit 200a connected to a sub bus connected to the electrical connectors 160a to 180a converts the communication protocol of a control signal of the load type electrical parts received from a LAN in a vehicle serving as a main bus of the vehicle to the communication protocol of the sub bus and transmits the protocol converted control signal to the electrical connectors 160a to 180a. Further, sensors or switches in the auxiliary machine modules 164a to 184a output signals to the control units.

14 Claims, 8 Drawing Sheets

ELECTRONIC DOOR SYSTEM WITH A LIN-SUBBUS

TECHNICAL FIELD

The present invention relates to an electronic door system for driving electrical parts for a vehicle mounted on the door of the vehicle and a harness system for a vehicle using the electronic door system.

BACKGROUND ART

FIG. 10 is a circuit diagram showing an electronic door system in a vehicle in a related art. The electronic door system of FIG. 10 shows an example of a vehicle having four doors. Door ECUs (Electronic Control Unit) 200a to 200d are respectively mounted on doors. The four door ECUs 200a to 200d are connected together by a LAN (Local Area Network) (main bus) communicated by a protocol such as a CAN (Controller Area Network) or a BEAN (Body Electronics Area Network) or the like.

The right front door ECU 200a controls a right front outer (remote control) mirror module 264a disposed in the door, a right front door lock module 274a, a right front power window module 284a, a right front power window switch module 244a, a right front curtsy lamp 254a and a curtsy lamp switch 294a disposed in the vehicle. The right rear door has the same structure as that of the right front door except the outer mirror module 264a. The structures of the left front door and the left rear door have the same structures as those of the right front and right rear doors. In the vehicle, an outer (remote control) mirror switch 214 is further provided and connected to a vehicle body ECU 210.

Load driving parts for driving motors or heaters in auxiliary equipment modules 264 to 284 such as outer mirror modules 264, door lock modules 274, etc. and sensors or switches and I/O parts for inputting/outputting signals in the auxiliary equipment modules 264 to 284 are contained in the door ECUs 200. The load driving parts and the I/O parts are connected to each of electrical parts in the auxiliary equipment modules 264 to 284 by wire harnesses. Further, the door ECU 200 includes a centralized control part for controlling the auxiliary equipment modules 264 to 284 connected thereto and a communication part for communicating with other ECUs. Accordingly, when the outer mirror switch 214 is turned ON/OFF, the vehicle body ECU 210 transmits a control signal from the communication part incorporated therein to the right front and left front doors ECU 200a and ECU 200c. The doors ECU 200a and ECU 200c decode the control signal in the centralized control parts incorporated therein and instruct the load driving parts of the outer mirror modules 264a and 264c contained therein to operate outer mirrors.

As the related art which is related to the present invention, the applicant of the present invention discloses in JP-A-2001-287605 a wire harness connected to a LAN for an option that even when the form of a vehicle is different, a basic main controller can be made common and a cost can be reduced. In the Patent Document 1, electrical parts for a vehicle are controlled through a gate wire harness from a sub ECU.

A usual electronic door system for a vehicle has such problems as described below. Firstly, when the specifications and functions of electrical load parts related to a door change, a wire harness connected to each ECU needs to be changed. Thus, the kinds and product numbers of wire harnesses are undesirably increased.

Secondly, when the functions of the electrical load parts related to the door increase, the number of circuits is increased and the wire harnesses are enlarged. As a result, a mass is undesirably increased.

Thirdly, owing to the centralized control by the ECUs, the increase of the functions of the electrical load parts related to the door undesirably causes the ECUs to be enlarged, the mass to be increased (the deterioration of a fuel efficiency and a traveling performance) and loading characteristics to be deteriorated. Further, software with which the ECUs are loaded is enlarged and the product numbers of the ECUs are increased. Consequently, the number of development processes is inconveniently increased and the number of specification adding and changing processes is undesirably increased.

DISCLOSURE OF THE INVENTION

With the above-described problems taken into consideration, the present invention is proposed and it is an object of the present invention to provide an electronic door system in which the functions of a usual ECU are distributed to respectively standardize the functions to individual functions and a wire harness can be simplified, the number of lines can be decreased and the weight of the wire harness can be reduced, and a harness system for a vehicle using the electronic door system.

Further, it is another object of the present invention to provide an electronic door system that can flexibly meet the change (difference in specification such as design, grade, etc.) of functions in an electrical load parts side related to a door and a harness system for a vehicle using the electronic door system.

In order to achieve the above object, according to the present invention, there is provided an electronic door system, comprising:

an auxiliary equipment module, provided on a door of a vehicle, and including an electrical parts which has at least one of a motor, a lamp, a heater, a sensor and a switch; and an electronic connector, connected to the auxiliary equipment module to drive a load type electrical parts which has at least one of the motor, the lamp and the heater in the auxiliary equipment module, and including:

a communicating unit, receiving a control signal for controlling the driving of the load type electrical parts;

a control unit, generating a drive signal for driving the load type electrical parts in accordance with either the control signal received by the communicating unit or a signal inputted from the sensor and the switch in the auxiliary equipment module; and a load driving unit, driving the load type electrical parts in accordance with the drive signal generated by the control unit.

In the above configuration, the load type electrical parts incorporated in the auxiliary equipment module is driven by the electronic connector having the communicating unit, the control unit and the load driving unit mounted on electronic board. Thus, the functions of the usual ECU (electronic control unit) for performing a centralized control can be distributed to standardize the respective functions to individual functions. Consequently, for the increase and enhanced functions of the electrical load parts related to a door, the electronic connectors can absorb the changes thereof to minimize the influence thereof to other electronic connector, electronic door control unit and wire harness.

Preferably, the electronic door system further includes an electronic door control unit, provided on the door, connected to a LAN in the vehicle serving as a main bus, and connected to a sub bus connected to the electronic connector. The electronic door control unit converts a communication protocol of the control signal received through the LAN in the vehicle to a communication protocol of the sub bus, and transmits the protocol converted control signal to the electronic connector.

In the above configuration, the electronic door control unit having a gateway function of the main bus and the sub bus converts the protocol of the control signal and transmits the converted control signal to the electronic connectors 160a to 180a. Thus, the main bus and the sub bus can form a layered network. For instance, when the main bus uses a transmitting medium having a high specification and the sub uses a transmitting medium of low cost, a low cost can be realized while desired communication speed is maintained.

Preferably, the electronic connector is directly connected to the auxiliary equipment module.

In the above configuration, the electronic connector is directly connected to the auxiliary equipment module (for instance, fitted and connected). Thus, while the electronic door control unit has been hitherto directly wired to the electrical parts in the auxiliary equipment module, the electronic connector directly connected to the auxiliary equipment module may be wired to the electronic door control unit. Thus, the wire harness can be simplified, the number of lines of the wire harnesses can be decreased and the weight of the wire harness can be reduced.

Here, it is preferable that, the electronic door control unit is connected to the electronic connectors by a power supply line, a GND line and a dedicated communication line as the sub bus.

In the above configuration, three wire harnesses of the power supply line, the GND line and the dedicated communication line can form a lower order from the electronic door control unit. Thus, the wire harness can be simplified, the number of lines can be decreased and the weight of the wire harness can be reduced.

Here, it is preferable that, the electronic door control unit is connected to the electronic connectors by a power supply line and a GND line. The control signal is superposed on the power supply line as the sub bus, and is transmitted to the electronic connector.

In the above configuration, the control signal is superposed on the power supply line to perform a communication. Thus, the two wire harnesses of the power supply line and the GND line can form a lower order from the electronic door control unit. The wire harness can be simplified, the number of lines can be decreased and the weight of the wire harness can be reduced.

Here, it is preferable that, the auxiliary equipment module has a plurality of auxiliary equipment modules; and wherein two auxiliary equipment modules of the auxiliary equipment modules is a door lock module and a power window module.

In the above configuration, the electronic door system with which the door lock module and the power window module are loaded in a standard form can be provided.

Preferably, the auxiliary equipment module has a plurality of auxiliary equipment modules. Three auxiliary equipment modules of the auxiliary equipment modules is an outer mirror module, a door lock module and a power window module.

In the above configuration, the electronic door system with which the outer mirror module, the door lock module and the power window module are loaded in a standard form can be provided.

According to the present invention, there is also provided an electronic door system, comprising:

an auxiliary equipment module, provided on a door of a vehicle, and including an electrical parts which has at least one of a motor, a lamp, a heater, a sensor and a switch, and the auxiliary equipment module including:
    a communicating unit, receiving a control signal for controlling the driving of a load type electrical parts which has at least one of the motor, the lamp and the heater in the auxiliary equipment module;
    a control unit, generating a drive signal for driving the load type electrical parts in accordance with either the control signal received by the communicating unit or a signal inputted from the sensor and the switch in the auxiliary equipment module; and
    a load driving unit, driving the load type electrical parts in accordance with the drive signal generated by the control unit.

In the above configuration, the auxiliary equipment module having load type electrical parts contained therein incorporate electronic board on which the communicating unit, the control unit and the load driving unit are mounted to drive the load type electrical parts by the electronic board. Thus, the functions of the usual electronic control unit for performing a centralized control can be distributed to respectively standardize the functions to individual functions. Consequently, for the increase and enhanced functions of the electrical load parts related to a door, the auxiliary equipment module can absorb the changes thereof to minimize the influence thereof to other electronic connectors, electronic door control units and wire harnesses.

Preferably, the electronic door system further comprise an electronic door control unit, provided correspondingly to the door, connected to a LAN in the vehicle serving as a main bus, and connected to a sub bus connected to the auxiliary equipment module. The electronic door control unit converts a communication protocol of the control signal received through the LAN in the vehicle to a communication protocol of the sub bus, and transmits the protocol converted control signal to the auxiliary equipment module.

In the above configuration, the electronic door control unit having a gateway function of the main bus and the sub bus converts the protocol of the control signal and transmits the converted control signal to the auxiliary equipment module. Thus, the main bus and the sub bus can form a layered network. For instance, when the main bus uses a transmitting medium having a high specification and the sub bus uses a transmitting medium of low cost, a low cost can be realized while desired communication speed is maintained.

According to the present invention, there is also provided a harness system for a vehicle, comprising:
    a plurality of the electronic door systems; and
    the LAN in the vehicle connected to the electronic door control unit of each electronic door system.

In the above configuration, the plurality of electronic door systems and the LAN in the vehicle connected to the electronic door control units of each electronic door system form the harness system for the vehicle. Thus, for the increase and improved functions of the electrical load parts related to the door, the electronic connectors can absorb the changes thereof to minimize the influence thereof to other electronic connectors, the electronic door control units, the wire harnesses and the LAN inn the vehicle.

BRIEF DESCRIPTION OF THE DRAWINGS

The above objects and advantages of the present invention will become more apparent by describing in detail preferred exemplary embodiments thereof with reference to the accompanying drawings, wherein.

BEST MODE FOR CARRYING OUT THE INVENTION

Now, embodiments of the present invention will be described in detail by referring to the accompanying drawings.

Before an electronic door system according to the embodiment of the present invention is described, electronic connectors and auxiliary equipment modules used in the electronic door system will be initially described.

Figure 3:
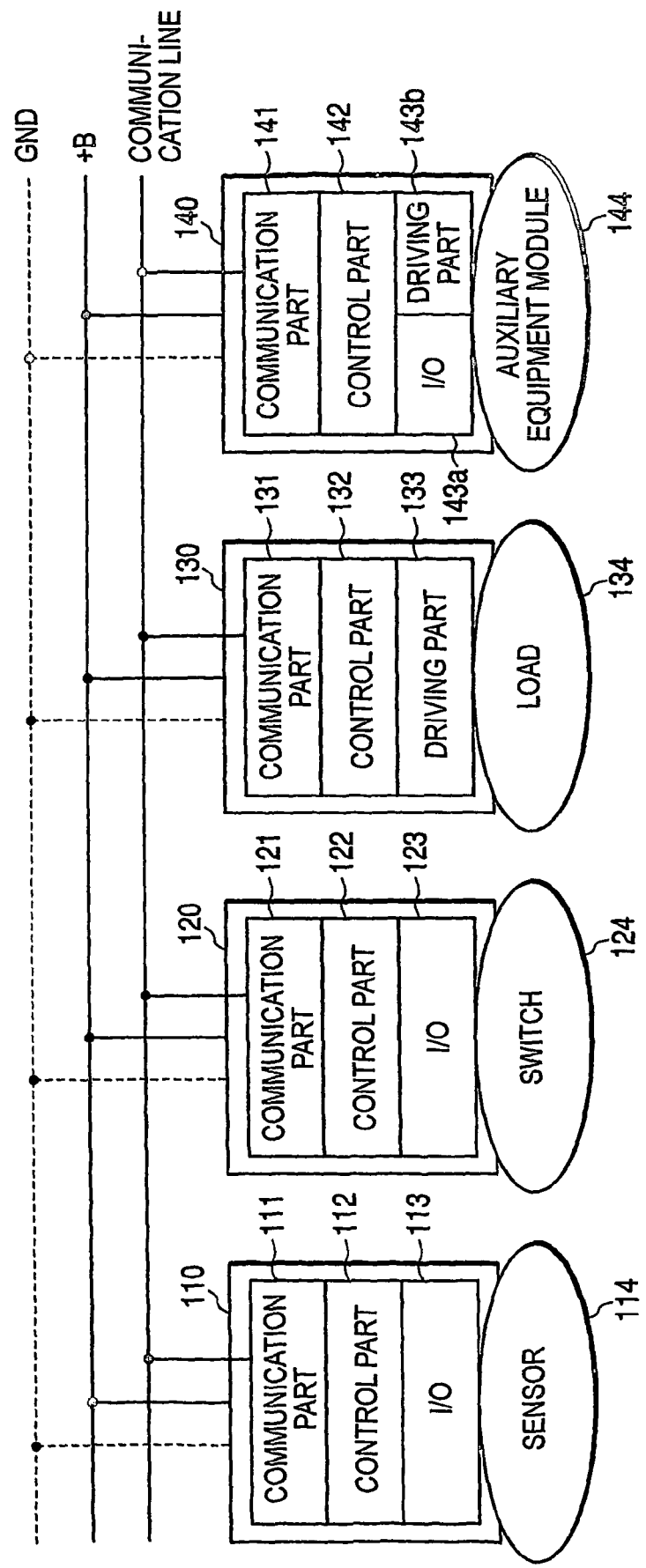
FIG. 3 is a functional block diagram of an electronic connector in the embodiment of the present invention.

FIG. 3 is a functional block diagram showing a basic concept of the electronic connector in an embodiment of the present invention. An electronic connector 110 directly connected to the connector of a sensor 114 includes a communication part 111, a control part 112 and an I/O part 113 mounted on an electronic board contained therein. An electronic connector 120 directly connected to a switch SW124 also includes a communication part 121, a control part 122 and an I/O part 123 mounted on an electronic board contained therein. An electronic connector 130 directly connected to a load (lamp, motor, etc.) 134 includes a communication part 131, a control part 132 and a driving part 133 mounted on an electronic board contained therein. An electronic connector 140 directly connected to an auxiliary equipment module 144 includes a communication part 141, a control part 142, an I/O part 143a and a driving part 143b mounted on an electronic board contained therein.

The auxiliary equipment module 144 has auxiliary equipments for realizing functions as well as the basic functions of a vehicle (for instance, a power window, a door lock, an outer mirror, etc.) as modules composed of a plurality of electrical parts. For instance, the auxiliary equipment module for realizing the power window includes at least one motor capable of rotating and reversing and two switches.

As described above, the combinations of a plurality of various kinds of electrical parts (motors, lamps, heaters, switches, sensors, etc.) form the auxiliary equipment module 144. The switches and the sensors of these electrical parts are connected to the I/O part 143a of the electronic connector 140 and monitored by the control part 142. Further, load type electrical parts such as motors, laps, etc. of the electrical parts are connected to the driving part 143b of the electronic connector 140 and driven. Here, the I/O part 143a of the electronic connector 140 is not necessary when the sensors or switches are not present in the auxiliary equipment module 144.

The communication parts 111 to 141 of the electronic connectors respectively communicate a control signal with other electronic connectors, ECUs or other systems by using a communication line or a power supply line to perform a communication therewith. As a communication protocol, a LIN (local interconnect network) or the like may be employed. Further, the communication parts can communicate with devices on a CAN (Control Area Network) through a gateway device from the LIN and devices on the LIN ahead the CAN.

The control part 112 receives a sensor signal of the sensor 114 such as a sensor for monitoring the state of the load 134 or a temperature sensor through the I/O part 113. The control part 112 performs a process on the received sensor signal such as attaching to the sensor signal addresses of other electronic connectors, the ECUs or the devices of other systems to which the signal is to be transmitted and outputs the processed sensor signal to the communication part 111 as a control signal.

When a user turns ON/OFF the switch SW124, the control part 122 receives an ON/OFF signal through the I/O part 123. The control part 122 processes the received ON/OFF signal such as attaching to the signal addresses of other electronic connectors, the ECUs or the devices of other systems to which the ON/OFF signal is to be transmitted and outputs the processed ON/OFF signal to the communication part 121 as a control signal.

The control part 132 receives a control signal for driving the load 134 from other electronic connectors, the ECUs or the devices of other systems through the communication part 131. The control part 132 controls the driving part 133 for driving the load 134 in accordance with the received control signal. The driving part 133 drives the load 134 such as lamps or motors, etc. by a semiconductor element such as an MOSFET. Further, the PWM (Pulse Width Modulation) control of the load 134 such as the adjustment of the speed of the motor can be performed.

When the sensors or the switches exist in the auxiliary equipment module 144, the control part 142 receives the sensor signal or the ON/OFF signal through the I/O part 143a. When the received sensor signal or the ON/OFF signal is a signal for a load in the same auxiliary equipment module 144, the control part 142 instructs the driving part 143b to drive the load. Further, when the received sensor signal or the ON/OFF is a signal for a load that does not exist in the same auxiliary equipment module 144, the control part 142 processes the received sensor signal or the ON/OFF signal such as attaching to the signal the addresses of other electronic connectors, the ECUs or the devices of other systems to which the signal is to be transmitted and outputs the processed signal to the communication part 141 as a control signal.

Further, when the load exists in the auxiliary equipment module 144, the control part 142 receives the control signal for driving the load from other electronic connectors, the ECUs, or the devices of other systems through the communication part 141. The control part 142 controls the driving part 143b for driving the load on the basis of the received control signal.

The electronic connectors 110 to 140 are respectively connected to a power supply line (battery line +B) and a GND line. Since the electronic connectors 110 to 140 are directly connected to the sensor 114, the switch SW124, the load 134 and the auxiliary equipment module 144, joints of power sources and earth are absorbed by electronic boards contained in the electronic connectors 110 to 140. The communication parts 111 to 141 of the electronic connectors 110 to 140 are respectively connected to a communication line. Here, when a power-supply superposition multiplex system is used for a communication, the communication line is not necessary. In that case, the communication parts 111 to 141 are connected to the power supply line.

Figure 4:
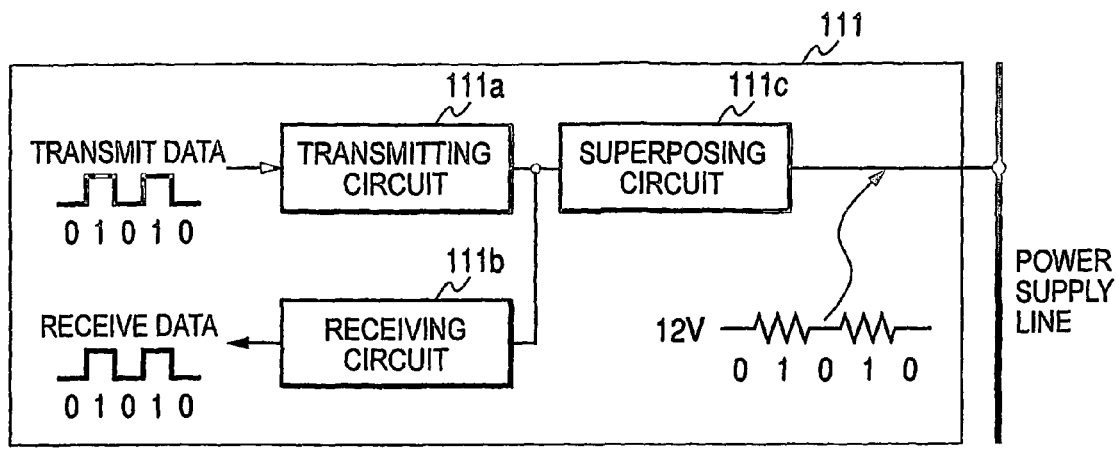
FIG. 4 is a block diagram showing the inner structure of a communication part when the power-supply superposition multiplex system is employed.

Here, the power-supply superposition multiplex system will be described below. The power-supply superposition multiplex system means a system that the communication is superposed on the power supply line to transmit a signal without using an exclusive communication line. FIG. 4 is a block diagram showing the inner structure of the communication part 111 when the power-supply superposition multiplex system is employed. The communication part 111 includes a transmitting circuit 111a, a receiving circuit 111b and a superposed circuit 111c.

The transmitting circuit 111a performs, for instance, an ASK (Amplitude Shift Keying) modulation to pulse type transmit data inputted from the control part 112 and outputs the modulated transmit data to the superposed circuit 111c. The superposed circuit 111c superposes the modulated signal inputted from the transmitting circuit 111a on the power supply line. Further, the superposed circuit 111c separates a signal addressed to its own electronic connector from the signal superposed on the power supply line and outputs this signal to the receiving circuit 111b. The receiving circuit 111b demodulates the signal inputted from the superposed circuit 111c and outputs a pulse type digital signal to the control part 112 as receive data.

Figure 5:
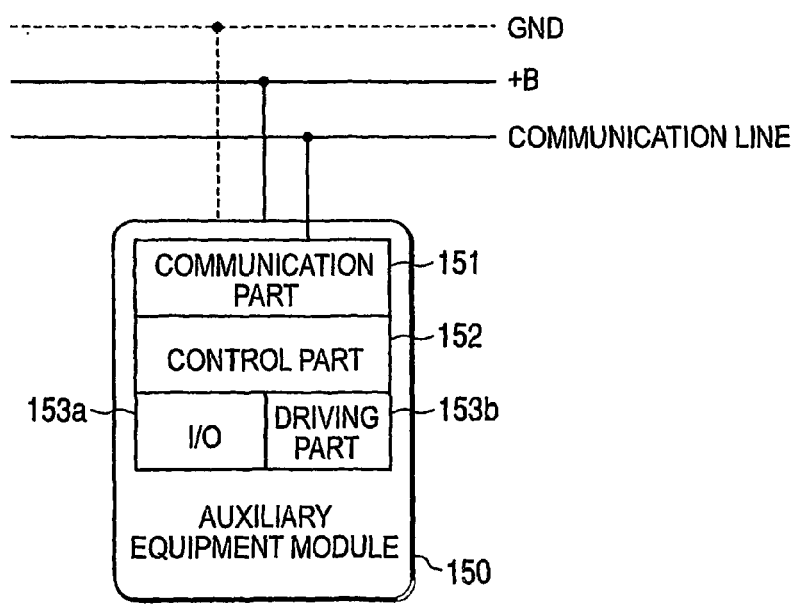
FIG. 5 is a functional block diagram showing the basic concept of an auxiliary equipment module in the embodiment of the present invention.

FIG. 5 is a functional block diagram showing a basic concept of an auxiliary equipment module in the embodiment of the present invention. The auxiliary equipment module 150 of the embodiment includes a communication part 151, a control part 152, an I/O part 153a and a driving part 153b mounted on an electronic board incorporated therein. The auxiliary equipment module 150 is connected to a power supply line (battery line+B) and a GND line. The communication part 151 of the auxiliary equipment module 150 is connected to a communication line. Here, when the power-supply superposition multiplex system is employed for a communication, this communication line is not necessary.

The functions of the communication part 151, the control part 152, the I/O part 153a and the driving part 153b mounted on the electronic board contained in the auxiliary equipment module 150 are the same as those of the members contained in the electronic connector 140. Therefore, an explanation thereof is omitted.

Figure 6:
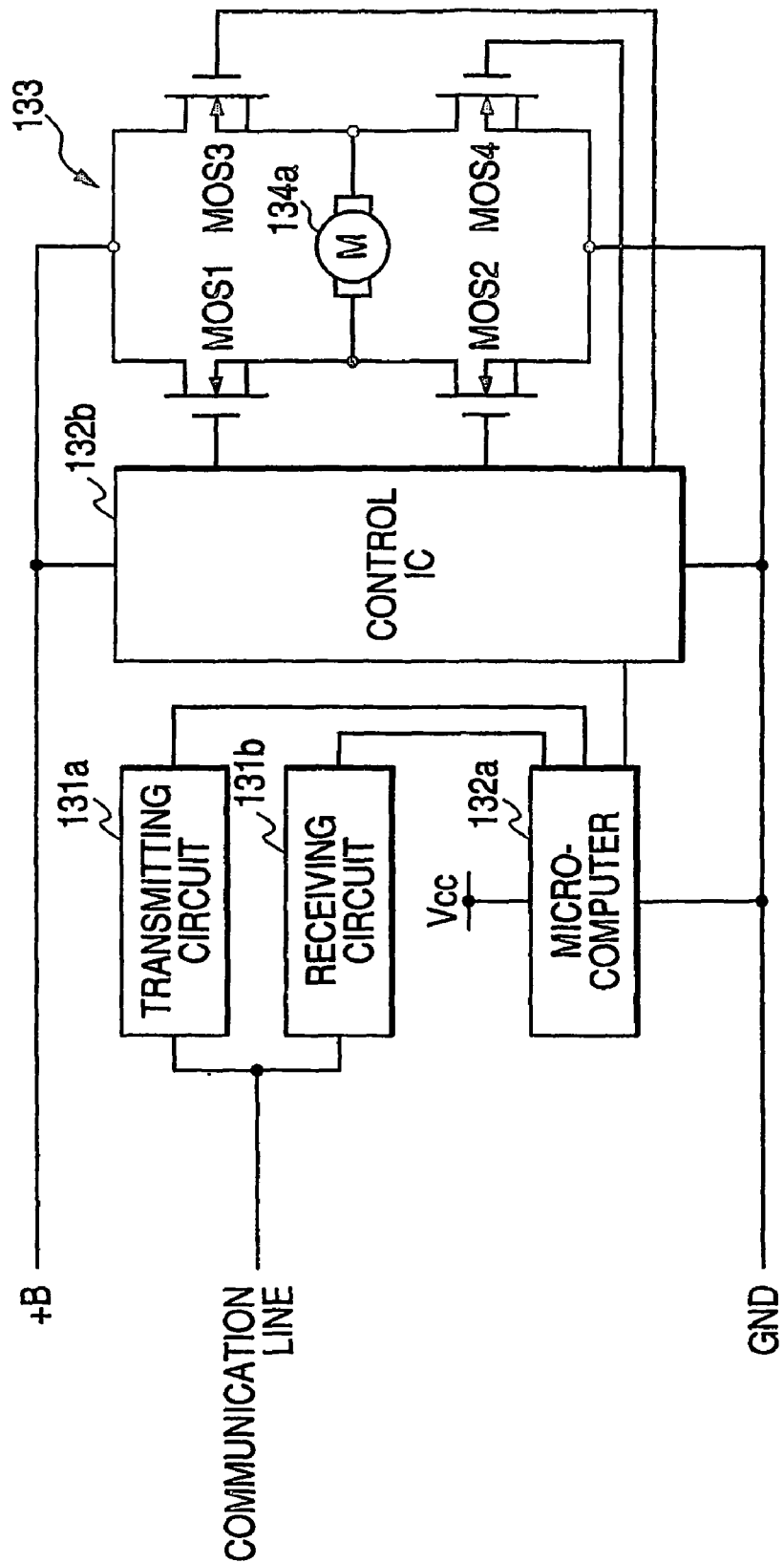
FIG. 6 is a diagram showing one example of a circuit structure (the communication system) on an electronic board contained in the electronic connector or the auxiliary equipment module in the embodiment of the present invention.

FIG. 6 is a diagram showing one example of a circuit structure (communication line mode) mounted on the electronic board contained in the electronic connector or the auxiliary equipment module in the embodiment of the present invention. In this embodiment, when the load 134 is a motor 134a, an example of the electronic connector directly connected to the motor 134a will be described. The electronic connector shown in FIG. 6 includes a transmitting circuit 131a, a receiving circuit 131b, a microcomputer 132a, a control IC 132b and an H-bridge circuit 133 composed of MOS type field effect transistors (MOS 1 to 4). When the load 134 is a lamp, a single MOS type field effect transistor can drive the load.

A power supply line for supplying battery power supplies the battery power to the control IC 132b and the H-bridge circuit 133. The transmitting circuit 131a modulates a pulse type digital signal inputted from the microcomputer 132a and outputs the modulated signal to a communication line. The receiving circuit 131b receives a control signal addressed to itself from the communication line, demodulates the control signal and outputs the demodulated control signal to the microcomputer 132a.

The control IC 132b is a custom IC such as an ASIC (Application Specific Integrated Circuit) or the like. The control IC 132b includes a high side MOS driver not shown for driving the MOS1 and the MOS3, a charge pump not shown for boosting voltage supplied to the high side MOS driver and a low side MOS driver not shown for driving the MOS2 and the MOS4 to control the normal rotation and reversal of the motor 134a. Here, the transmitting circuit 131a and the receiving circuit 131b may be incorporated in the control IC 132b in the drawing to form an IC and further the microcomputer 132a may be incorporated in the control IC 132b to form an IC.

The microcomputer 132a decodes the control signal inputted from the receiving circuit 131b and outputs the decided control signal to the high side MOS driver and the low side MOS driver. Further, when the microcomputer 132a needs to transmit the control signal to other electronic connectors or the ECUs, the microcomputer outputs the control signal to the transmitting circuit 131a.

In the H-bridge circuit 133, when the motor 134a is normally rotated, the MOS1 and the MOS4 are turned ON and the MOS2 and the MOS3 are turned OFF. When the motor 134a is reversed, the MOS2 and the MOS3 are turned ON and the MOS1 and the MOS4 are turned OFF. Accordingly, when the motor 134a is normally rotated, the high side MOS driver turns MOS1 ON and the MOS3 OFF. When the motor 134a is reversed, the high side MOS driver turns MOS1 OFF and the MOS3 ON. When the motor 134a is normally rotated, the low side MOS driver turns the MOS2 OFF and the MOS4 ON. When the motor 134a is reversed, the low side MOS driver turns the MOS2 ON and the MOS4 OFF.

When the speed of the motor 134a needs to be controlled, a PWM control circuit not shown in the drawing is provided in the control IC 132b. The PWM control circuits are provided in the pre-stages of the high side MOS driver and the low side MOS driver to output PWM wave forms having arbitrary duty ratio to the high side MOS driver and the low side MOS driver.

Figure 7:
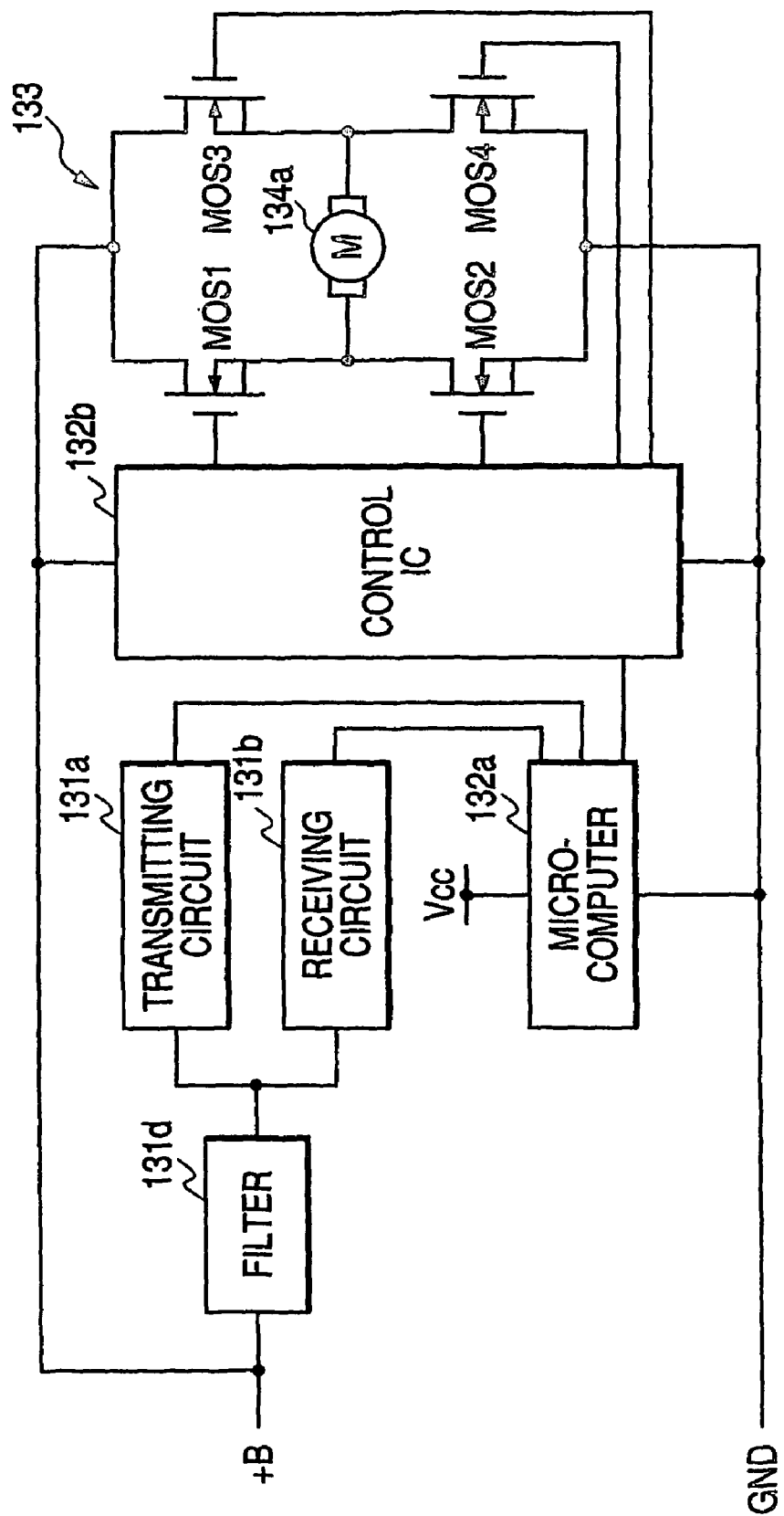
FIG. 7 is a diagram showing one example of a circuit structure (the power-supply superposition multiplex system) on an electronic board contained in the electronic connector or the auxiliary equipment module in the embodiment of the present invention.

FIG. 7 is a diagram showing one example of a circuit structure (power-supply superposition multiplex system) mounted on the electronic board contained in the electronic connector or the auxiliary equipment module in the embodiment of the present invention. The electronic connector shown in FIG. 7 includes a transmitting circuit 131a, a receiving circuit 131b, a filter 131d, a microcomputer 132a, a control IC 132b and an H-bridge circuit 133 composed of MOS type field effect transistors (MOS 1 to 4).

The filter 131d is a band-pass filter for filtering a band for carrying a control signal superposed on a power supply line. The filter 131d outputs the signal filtered the band to the receiving circuit 131b. Other elements are the same as those of the communication line system. Accordingly, the explanation of them is omitted.

Figure 8:
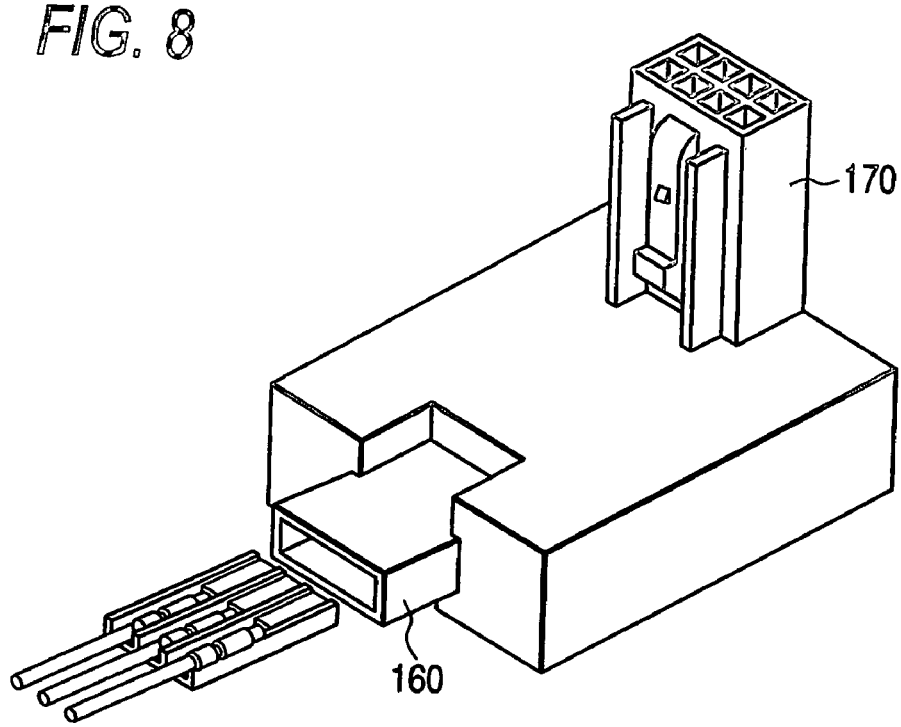
FIG. 8 is a perspective view showing a general appearance of the electronic connector (the communication line system) in the embodiment of the present invention.

FIG. 8 is a perspective view showing the general appearance of the electronic connector (the communication line system) in the embodiment of the present invention. The electronic connector shows one example of the electronic connectors connected to the auxiliary equipment modules. The electronic connector 140 has a socket 160 into which the three wire harnesses of the power supply line, the GND line and the communication line are inserted. The electronic connector 140 is connected to the auxiliary equipment module 144 in such a manner that pins of the auxiliary equipment module 144 are fitted and connected to the socket 170 of the electronic connector 140. The form of the electronic connector 140 shown in FIG. 8 simply illustrates one example. The electronic connector may be formed in various shapes so as to meet the auxiliary equipment module 144. In the electronic connector 140, an electronic board on which ICs (ASIC, or the like) or semiconductor switching elements are mounted is incorporated.

Figure 9:
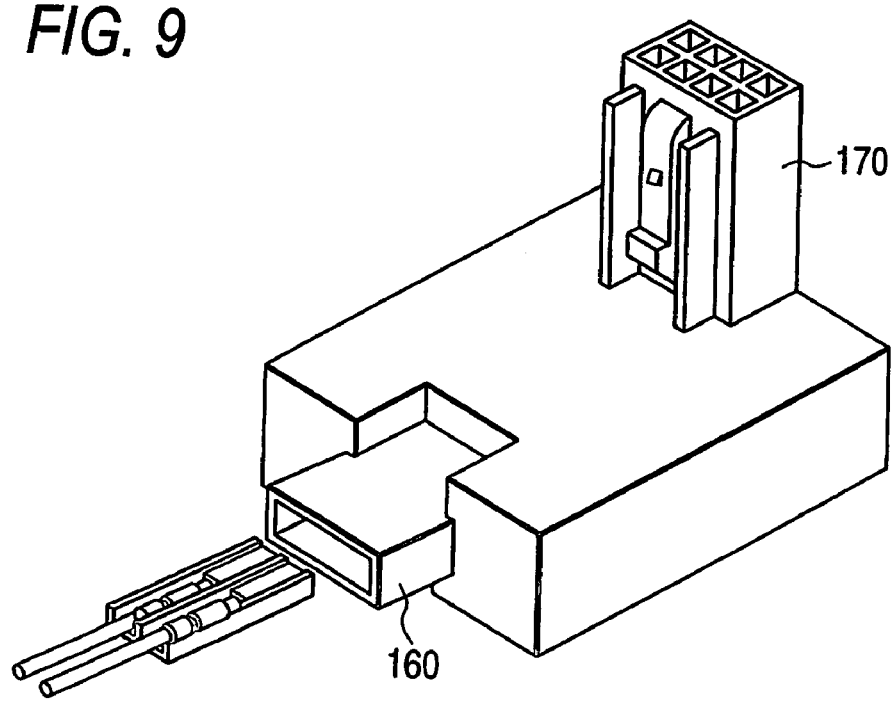
FIG. 9 is a perspective view showing a general appearance of the electronic connector (the power-supply superposition multiplex system) in the embodiment of the present invention.
Figure 10:
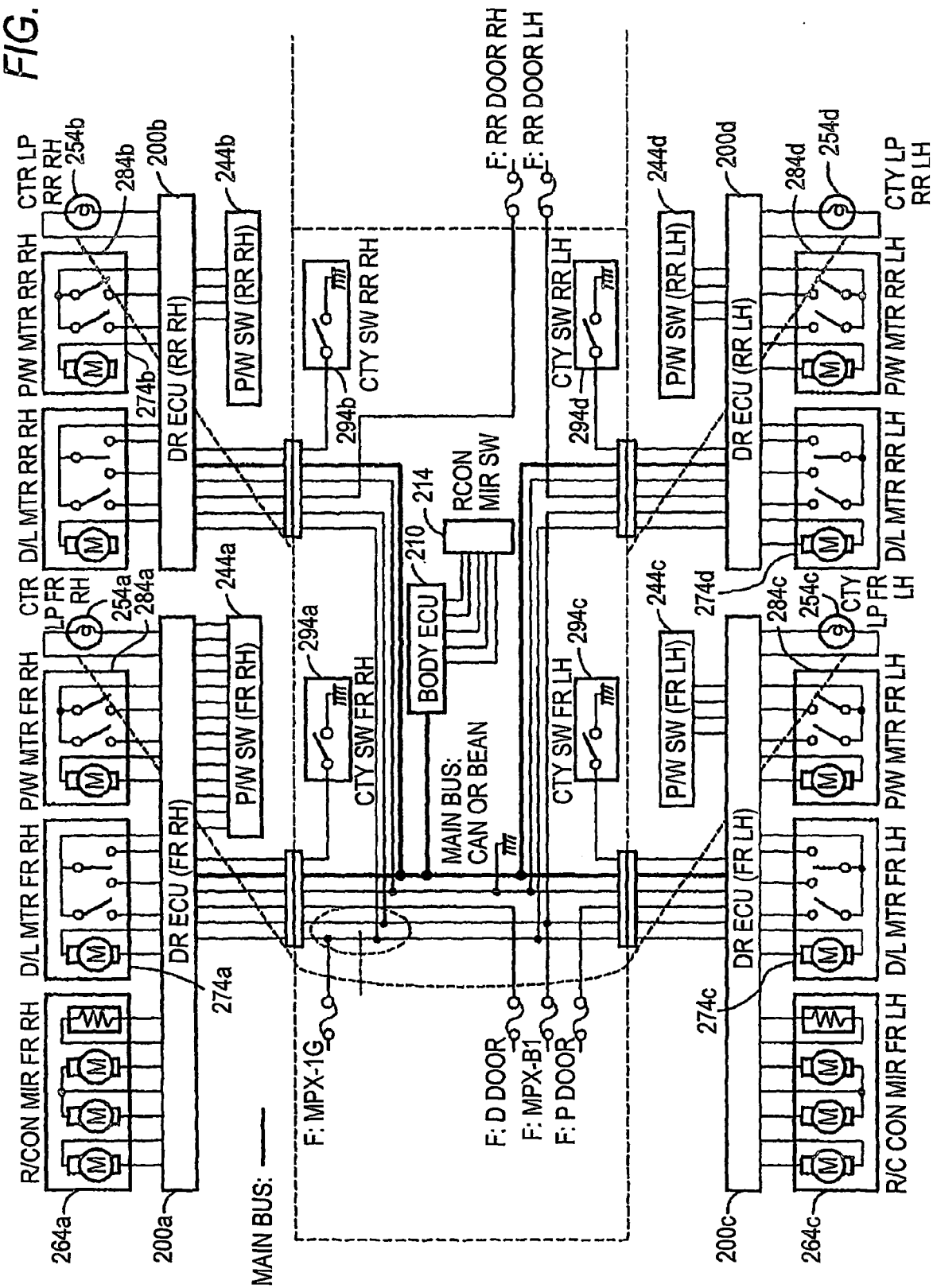
FIG. 10 is a circuit diagram showing an electronic door system of a related art.

FIG. 9 is a perspective view showing a general appearance of the electronic connector (the power-supply superposition multiplex system) in the embodiment of the present invention. The electronic connector 140 has a socket 160 into which the two wire harnesses of the power supply line and the GND line are inserted. Other elements are the same as those in the communication line system. Thus, the explanation of them is omitted. Since wires have been hitherto laid from the ECU to individual electrical parts in the auxiliary equipment module 144, about ten wire harnesses have been required. However, the electronic connector of the present invention is used so that the number of wire harnesses can be reduced to two or three.

Figure 1:
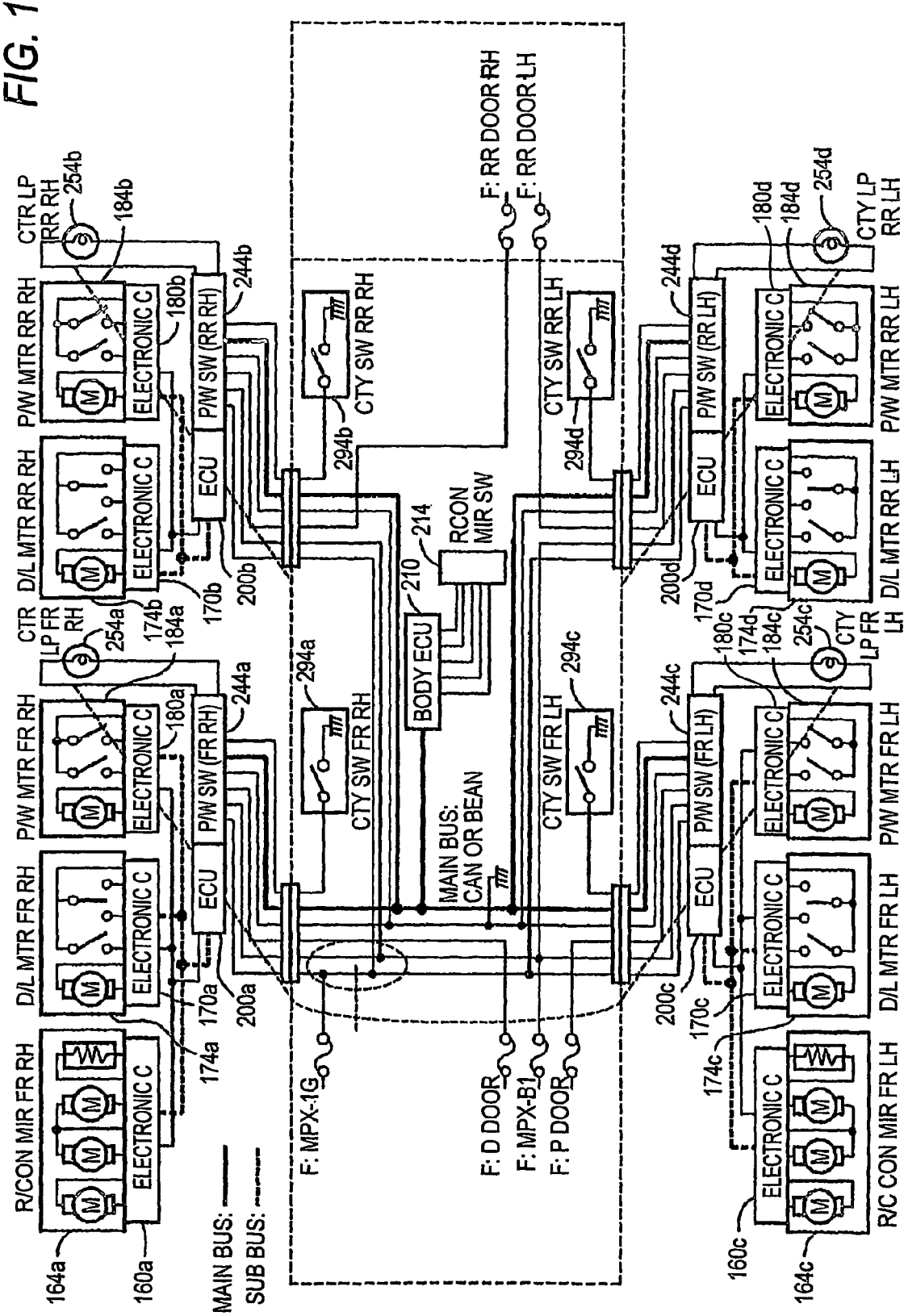
FIG. 1 is a circuit diagram showing an electronic door system (a communication line system) according to an embodiment of the present invention.

Now, the electronic door system according to an embodiment of the present invention will be described below. FIG. 1 is a circuit diagram showing the electronic door system (the communication line system) according to the embodiment of the present invention. The electronic door system shown in FIG. 1 shows an example of a four-door vehicle. Door ECUs 200a to 200d having gateway functions are respectively mounted on the doors. The four door ECUs 200a to 200d serving as communication masters are connected together by the LAN (the main bus) in the vehicle in which a communication is performed by a protocol such as the CAN or the BEAN, etc. The door ECUs 200a to 200d may not be mounted on the door sides, and may be mounted on a body side.

A right front door ECU 200a is connected to electronic connectors 160a to 180a respectively directly connected to right front auxiliary equipment modules 164a to 184a by a power supply line, a GND line and a communication line (a sub bus) in which a communication is performed by a protocol such as the LIN (Local Interconnect Network). The electronic connectors 160a to 180a serve as slave machines relative to the door ECU 200a. The electronic connector 160a is connected to a right front outer mirror (a remote control mirror) module 164a by a short power supply line. The electronic connector 170a is directly connected to a right front door lock module 174a. The electronic connector 180a is directly connected to a right front power window module 184a.

Further, the door ECU 200a is directly connected to a right front power window switch 244a. The door ECU 200a incorporates therein a load driving part for driving a curtsy lamp 254a disposed in a right front door. The door ECU 200a is connected to the curtsy lamp 254a by a short power supply line. Further, the door ECU 200a contains therein an I/O part for transmitting a signal to and receiving a signal from a curtsy lamp switch 294a disposed in the vehicle. The door ECU 200a is connected to the curtsy lamp switch 294a by a short power supply line. The curtsy lamp 254a, the load driving part for driving the curtsy lamp, the curtsy lamp switch 294a and the I/O part for communicating the signal with the curtsy lamp switch 294a may not be provided.

A right rear door has the same structure as that of the right front door except the outer mirror module 164a. Left front and left rear doors have the same structures as those of the right front and right rear doors. Further, in the vehicle, an outer (remote control) mirror switch 214 is disposed and connected to a vehicle body ECU 210. The outer mirror switch 214 includes a switch for storing/returning an outer mirror and a switch for moving a mirror surface upward and downward and rightward and leftward. When a heater is attached to the outer mirror module 164a, the outer mirror switch also includes a switch of the heater.

The outer mirror module 164a includes a motor for storing/returning a mirror, a motor for moving a mirror surface upward/downward, a motor for moving a mirror surface rightward/leftward and the heater. The outer mirror module 164a is not limited to this structure. The outer mirror module 164a may include a sensor or a lamp and may not include the heater.

The door lock module 174a includes a motor and two switches. The door lock module 174a is not limited to this structure. The motor may be divided into a locking motor and a closer motor. The door lock module 174a may include switches such as a plurality of cam switches, a full-latch switch, a half-latch switch, a key switch (for locking), a key switch (for unlocking), etc.

The power window module 184a includes a motor capable of rotating and reversing, a pulse sensor and a limit switch.

The electronic connector 160a includes a load driving part for driving the outer mirror module 164a, a control part for controlling the outer mirror module 164a and a communication part for communicating with the outer mirror switch 214 through the door ECU 200a and the vehicle body ECU 210. The communication part can communicate with other electronic connectors or other ECUs. When the outer mirror switch 214 is turned ON/OFF, an I/O part incorporated in the vehicle body ECU 210 detects it. A control part incorporated in the vehicle body ECU 210 generates a control signal and a communication part incorporated therein transmits the control signal to the door ECU 200a through the main bus (for instance, CAN).

A communication part contained in the door ECU 200a receives the control signal from the main bus (for instance, the CAN). A control part contained in the door ECU 200a converts the communication protocol of the received control signal and outputs the converted control signal to the communication part. The communication part transmits the control signal to a destination (the electronic connector 160a) of the control signal through the sub bus (for instance, the LIN).

The communication part contained in the electronic connector 160a separates the control signal directed to itself from the sub bus. The control part contained in the electronic connector 160a decodes the separated control signal. The load driving part contained in the electronic connector 160a drives the motor in the outer mirror module 164a in accordance with the decoded control signal. For instance, when the control signal is a signal for instructing the outer mirror to be stored, the load driving part rotates the motor for storing/returning the motor to store the outer mirror.

In the electronic connector 170a and the electronic connector 180a, communication parts contained therein likewise receive control signals transmitted from other electronic connectors or the ECUs through the sub bus. Control parts contained therein decode the control signals and load driving parts contained therein respectively drive motors in the door lock module 174a and the power window module 184a. For the right rear door, the same control is performed except the control of the outer mirror module 164a. Left front and left rear doors are controlled in the same manner as those of the right front and right rear doors.

Figure 2:
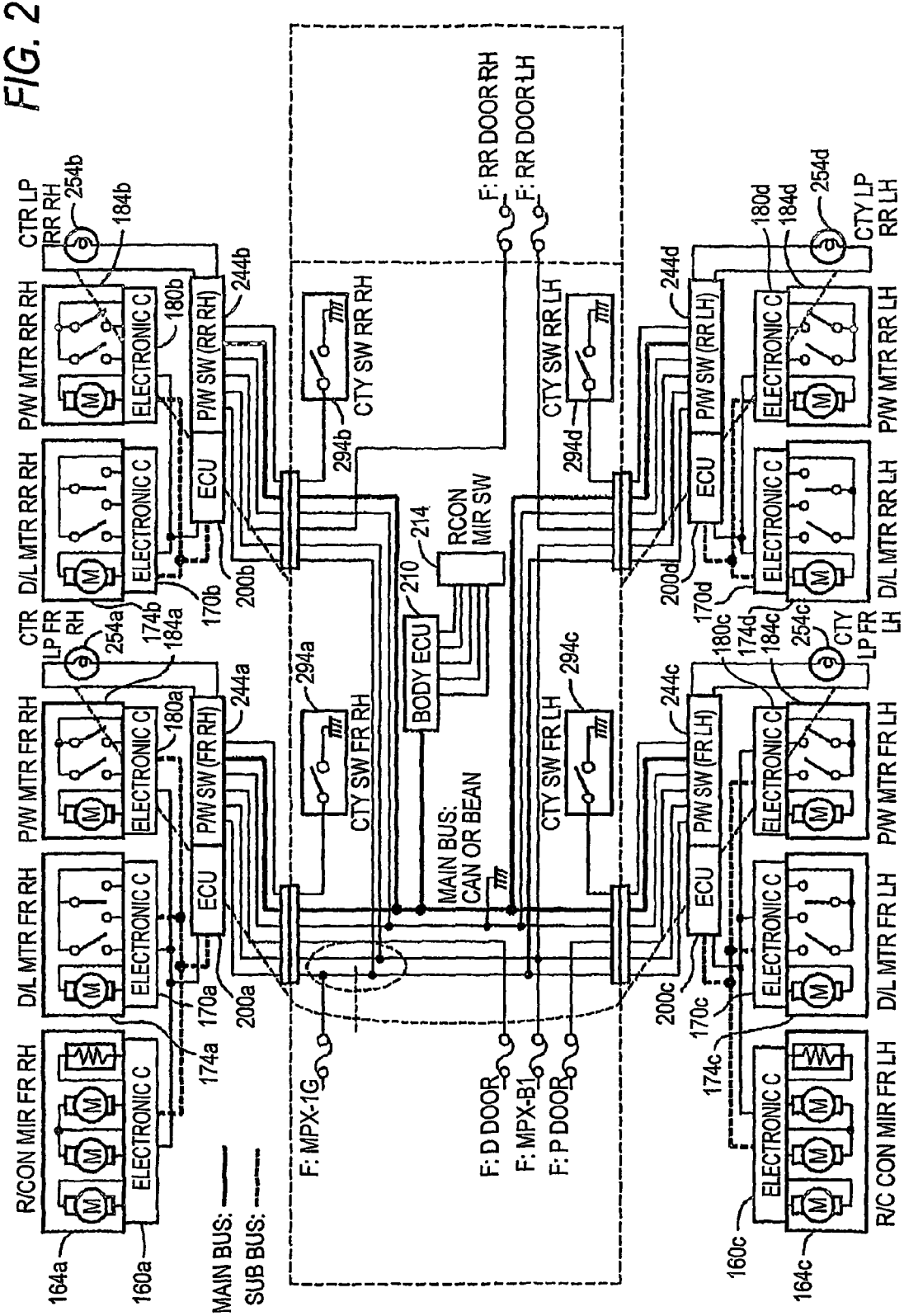
FIG. 2 is a circuit diagram showing an electronic door system (a power-supply superposition multiplex system) according to an embodiment of the present invention.

FIG. 2 is a circuit diagram showing an electronic door system (the power-supply superposition multiplex system) according to an embodiment of the present invention. The electronic door system shown in FIG. 2 has the basically same structure as that of the electronic door system shown in FIG. 1. The electronic door system shown in FIG. 2 is different from the electronic door system shown in FIG. 1 from the viewpoint that the power supply line is used as a sub bus without using the communication line.

Accordingly, when a communication part contained in a door ECU 200 receives from a main bus a control signal directed to electronic connectors 160 to 180 serving as the slave devices of itself, a control part contained in the door ECU 200 converts the communication protocol of the received control signal and transmits the converted control signal to the communication part. The communication part superposes the control signal on a power supply line as a sub bus and transmits the superposed control signal to the destinations (the electronic connectors 160 to 180) of the control signal.

Communication parts contained in the electronic connectors 160 to 180 respectively separate the control signal superposed on the power supply line (the sub bus). Control parts contained in the electronic connectors 160 to 180 respectively decode the separated control signal and load driving parts contained therein respectively drive motors or heaters of auxiliary equipment modules 164 to 184 in accordance with the decoded control signal. Other structures and operations are the same as those of the electronic door system shown in FIG. 1.

The above-described embodiment shows one example of preferred embodiments of the present invention. The present invention is not limited thereto and various modifications may be made within a scope without departing the gist thereof.

In FIGS. 1 and 2, an example that the electronic connectors 160 to 180 directly connected to the auxiliary equipment modules 164 to 184 or connected thereto by a short power supply line incorporate electronic boards on which ICs or semiconductor switching elements for controlling the auxiliary equipment modules 164 to 184 are mounted is described. However, the electronic boards may be mounted in the auxiliary equipment modules 164 to 184. In that case, the electronic connectors 160 to 180 do not need to be provided. Other structures and operations are the same as those described by referring to FIGS. 1 and 2.

Further, an example that the outer mirror, the door lock, the power window, and the curtsy lamp are mounted, as the auxiliary equipments, on the above-described electronic door system is described. However, the auxiliary equipments are not limited to the combinations of them and such auxiliary equipments as an easy door closer, a smart key, an RF speaker, etc. may be mounted on the electronic door system.

Further, the individual auxiliary equipments mounted on the electronic door system are driven by any of the door ECU 200, the electronic connectors 160 to 180 and the auxiliary equipment modules 164 to 184. However, each of the auxiliary equipments may be arbitrarily adapted to be driven by any of the door ECU 200, the electronic connectors 160 to 180 and the auxiliary equipment modules 164 to 184. For example, the auxiliary equipments may be partly driven from the electronic connectors 160 to 180 and the auxiliary equipments may be partly driven from the electronic boards in the auxiliary equipment modules 164 to 184. Further, the auxiliary equipments may be partly driven from the door ECU.

INDUSTRIAL APPLICABILITY

As apparent from the above-description, the load type electrical parts incorporated in the auxiliary equipment modules are driven by the electronic connectors having the communicating units, the control units and the load driving units mounted on electronic boards. Thus, the functions of the usual ECUs (electronic control units) for performing a centralized control can be distributed to standardize the respective functions to individual functions. Consequently, for the increase and enhanced functions of the electrical load parts related to a door, the electronic connectors can absorb the changes thereof to minimize the influence thereof to other electronic connectors, electronic door control units and wire harnesses.

Further, the electronic door control unit having a gateway function of the main bus and the sub bus converts the protocol of the control signal and transmits the converted control signal to the electronic connectors. Thus, the main bus and the sub bus can form a layered network. For instance, when the main bus uses a transmitting medium having a high specification and the sub uses a transmitting medium of low cost, a low cost can be realized while desired communication speed is maintained.

Further, the electronic connectors are directly connected to the auxiliary equipment modules. Thus, while the electronic door control unit has been hitherto directly wired to the electrical parts in the auxiliary equipment modules, the electronic connectors directly connected to the auxiliary equipment modules may be wired to the electrical parts. Thus, the wire harness can be simplified, the number of lines of the wire harness can be decreased and the weight of the wire harness can be reduced.

Further, three wire harnesses of the power supply line, the GND line and the exclusive communication line can form a lower order from the electronic door control unit. Thus, the wire harness can be simplified, the number of lines can be decreased and the weight of the wire harness can be reduced.

Further, the control signal is superposed on the power supply line to perform a communication. Thus, the two wire harnesses of the power supply line and the GND line can form a lower order from the electronic door control unit. The wire harness can be simplified, the number of lines can be decreased and the weight of the wire harness can be reduced.

Further, the electronic door system with which the door lock module and the power window module are loaded in a standard form can be provided.

Further, the electronic door system with which the outer mirror module, the door lock module and the power window module are loaded in a standard form can be provided.

Further, the auxiliary equipment modules having load type electrical parts contained therein incorporate electronic boards on which the communicating units, the control units and the load driving units are mounted to drive the load type electrical parts by the electronic boards. Thus, the functions of the usual electronic control units for performing a centralized control can be distributed to respectively standardize the functions to individual functions. Consequently, for the increase and enhanced functions of the electrical load parts related to a door, the electronic connectors can absorb the changes thereof to minimize the influence thereof to other electronic connectors, electronic door control units and wire harnesses.

Further, the electronic door control unit having a gateway function of the main bus and the sub bus converts the protocol of the control signal and transmits the converted control signal to the auxiliary equipment modules. Thus, the main bus and the sub bus can form a layered network. For instance, when the main bus uses a transmitting medium having a high specification and the sub bus uses a transmitting medium of low cost, a low cost can be realized while desired communication speed is maintained.

Further, the plurality of electronic door systems and the LAN in the vehicle connected to the electronic door control units of each electronic door system form the harness system for the vehicle. Thus, for the increase and improved functions of the electrical load parts related to the door, the electronic connectors can absorb the changes thereof to minimize the influence thereof to other electronic connectors, the electronic door control units, the wire harnesses and the LAN in the vehicle.

The invention claimed is:

1. An electronic door system, comprising:
an auxiliary equipment module, provided on a door of a vehicle, and including an electrical parts which has at least one of a motor, a lamp, a heater, a sensor and a switch;
an electronic connector, connected to the auxiliary equipment module to drive a load type electrical parts which has at least one of the motor, the lamp and the heater in the auxiliary equipment module, and including:
a communicating unit, receiving a control signal for controlling the driving of the load type electrical parts;
a control unit, generating a drive signal for driving the load type electrical parts in accordance with either the control signal received by the communicating unit or a signal inputted from the sensor and the switch in the auxiliary equipment module; and
a load driving unit, driving the load type electrical parts in accordance with the drive signal generated by the control unit; and
the electronic door system further comprising an electronic door control unit, provided on the door, connected to a LAN in the vehicle serving as a main bus, and connected to a sub bus connected to the electronic connector,
wherein the electronic door control unit converts a communication protocol of the control signal received through the LAN in the vehicle to a communication protocol of the sub bus, and transmits the protocol converted control signal to the electronic connector.

2. The electronic door system as set forth in claim 1, wherein the electronic connector is directly connected to the auxiliary equipment module.

3. The electronic door system as set forth in claim 1, wherein the electronic door control unit is connected to the electronic connectors by a power supply line, a GND line and a dedicated communication line as the sub bus.

4. The electronic door system as set forth in claim 1, wherein the electronic door control unit is connected to the electronic connectors by a power supply line and a GND line; and
wherein the control signal is superposed on the power supply line as the sub bus, and is transmitted to the electronic connector.

5. The electronic door system as set forth in claim 1, wherein the auxiliary equipment module has a plurality of auxiliary equipment modules; and
wherein two auxiliary equipment modules of the auxiliary equipment modules is a door lock module and a power window module.

6. The electronic door system as set forth in claim 1, wherein the auxiliary equipment module has a plurality of auxiliary equipment modules; and
wherein three auxiliary equipment modules of the auxiliary equipment modules is an outer mirror module, a door lock module and a power window module.

7. An electronic door system, comprising:
an auxiliary equipment module, provided on a door of a vehicle, and including an electrical parts which has at least one of a motor, a lamp, a heater, a sensor and a switch, and the auxiliary equipment module including:
a communicating unit, receiving a control signal for controlling the driving of a load type electrical parts which has at least one of the motor, the lamp and the heater in the auxiliary equipment module;
a control unit, generating a drive signal for driving the load type electrical parts in accordance with either the control signal received by the communicating unit or a signal inputted from the sensor and the switch in the auxiliary equipment module; and
a load driving unit, driving the load type electrical parts in accordance with the drive signal generated by the control unit; and
the electronic door system further comprising an electronic door control unit, provided correspondingly to the door, connected to a LAN in the vehicle serving as a main bus, and connected to a sub bus connected to the auxiliary equipment module,
wherein the electronic door control unit converts a communication protocol of the control signal received through the LAN in the vehicle to a communication protocol of the sub bus, and transmits the protocol converted control signal to the auxiliary equipment module.

8. A harness system for a vehicle, comprising:
a plurality of electronic door systems according to claim 1; and the LAN in the vehicle connected to the electronic door control unit of each electronic door system.

9. A harness system for a vehicle, comprising:
a plurality of electronic door systems according to claim 2; and the LAN in the vehicle connected to the electronic door control unit of each electronic door system.

10. A harness system for a vehicle, comprising:
a plurality of electronic door systems according to claim 3; and the LAN in the vehicle connected to the electronic door control unit of each electronic door system.

11. A harness system for a vehicle, comprising:
a plurality of electronic door systems according to claim 4; and the LAN in the vehicle connected to the electronic door control unit of each electronic door system.

12. A harness system for a vehicle, comprising:
a plurality of electronic door systems according to claim 5; and the LAN in the vehicle connected to the electronic door control unit of each electronic door system.

13. A harness system for a vehicle, comprising:
a plurality of electronic door systems according to claim 6; and the LAN in the vehicle connected to the electronic door control unit of each electronic door system.

14. A harness system for a vehicle, comprising:
a plurality of electronic door systems according to claim 7; and the LAN in the vehicle connected to the electronic door control unit of each electronic door system.

* * * * *